United States Patent [19]
Smith

[11] Patent Number: 4,956,769
[45] Date of Patent: Sep. 11, 1990

[54] OCCURENCE AND VALUE BASED SECURITY SYSTEM FOR COMPUTER DATABASES

[75] Inventor: Robert D. Smith, Malibu, Calif.

[73] Assignee: Sysmith, Inc., Marina Del Rey, Calif.

[21] Appl. No.: 194,481

[22] Filed: May 16, 1988

[51] Int. Cl.[5] .......................... H04L 9/00; G06F 13/00
[52] U.S. Cl. ..................................... 364/200; 364/900; 364/222.5; 364/286.4; 364/918.7; 380/25
[58] Field of Search ... 364/200 MS File, 900 MS File; 340/2, 3, 5, 825.31, 825.34; 380/25; 379/95

[56] References Cited

U.S. PATENT DOCUMENTS

| | | | |
|---|---|---|---|
| 4,498,132 | 2/1985 | Ahlstrom et al. | 364/200 |
| 4,652,990 | 3/1987 | Pailen et al. | 364/200 |
| 4,654,792 | 3/1987 | Thomas | 364/200 |
| 4,799,153 | 1/1989 | Hann et al. | 364/200 |
| 4,825,354 | 4/1989 | Agrawal et al. | 364/200 |

Primary Examiner—Michael R. Fleming
Assistant Examiner—Gopal C. Ray
Attorney, Agent, or Firm—Matthew F. Jodziewicz

[57] ABSTRACT

A method for providing an occurrence level, value based security protection system including the steps of building a data security table; extracting from the request to the database information concerning the system user, his terminal location, the data he wishes to access, and the operation he wishes to perform on the data; comparing these extracted pieces of information against the permitted access rules found in the data security table; returning a violation status to the host system making the request if the compared information fails to match the permitted access rules found in the data security table and logging the violation; permitting the execution of the request if the extracted data is found to match the permitted access rules found in the data security table.

6 Claims, 2 Drawing Sheets

OCCURENCE AND VALUE BASED SECURITY SYSTEM FOR COMPUTER DATABASES

BACKGROUND OF THE INVENTION

1. Field of the Invention

This invention relates in general to computer security systems, and, more particularly, to an occurrence level, value-based security system capable of limiting the access of some selected users and terminal locations to only some preselected, but variable, operations on selected database records and fields.

2. Description of the Related Art

As computing has evolved over the last several decades, it has become more accessible to the general public and user. The number and size of computer installations has increased dramatically over this period of time and is continuing to increase at an ever increasing rate. Single-computer, timesharing systems and remote access systems have highlighted the vulnerability of data communications as a key security issue in computing. That vulnerability today is becoming more serious with the proliferation of computer networking.

Another trend over this period of time has been to assign computers more of the chores of managing our personal and business activities. Computers are routinely handling the most sensitive correspondence. For example, electronic funds transfer systems pass our money around the globe in bit streams, and sensitive governmental communications are sent among various departments by computer networks.

There are several reasons why computer security is receiving so much attention at present. The availability of personal computers has brought computer literacy to the general public. Millions of people have taken computer courses in various schools, read computer books, purchased personal computers, or used computer systems at work. In today's highly computerized society, those who would commit fraud or a crime are often faced with penetrating a computer system's defenses to achieve their goal.

It is therefore important to implement security measures to ensure the uninterrupted and uncorrupted functioning of these systems. This problem has been approached on both a hardware and software level and various security protection schemes are currently available to provide some measure of system security.

SUMMARY OF THE INVENTION

The present invention provides an occurrence level, value-based security system that offers additional security protection to existing protection schemes that is basically transparent to the existing system.

The present invention can also be used in a "stand alone" configuration to provide system security that can be tailored to the needs and demands of the host system.

In general, in a computer system that acts to interface Input/Output requests between at least one system user, identified by a "userid" or unique user identification symbol, that is accessing the system from at least one terminal location with a terminal address, and at least one database having data records, including data fields, the invention includes a method for providing occurrence level, value based security protection, limiting the access of selected users and terminal locations to preselected, but variable, Input/Output operations on selected data records and data fields of the databases, and includes the steps of establishing a series of security data tables.

The first of these tables is a data security access table. The data security access table has, for each data record and data field selected for security protection, a first entry identifying the data record or the data field and a second data security profile entry defining the Input/Output operations permitted on the data record or the data field identified by said first data security access table entry.

A second table that is established is a user security access table that has, for each user selected to have Input/Output access to the database, a first entry identifying the user and a second user security profile entry defining the Input/Output operations permitted on the database by the user identified by said first user security access table entry.

A third table that is established is a terminal location security access table that has, for each terminal location selected to have Input/Output operation access to the database, a first entry identifying the terminal location, and a second terminal location security profile entry defining the Input/Output operations permitted on the database from the terminal location identified by said first terminal location security access table entry.

Each Input/Output request from the host system to the database is parsed, and the userid of the system user making the Input/Output request is extracted therefrom, along with the data record or data field that is the subject of the Input/Output request, the terminal location address from which the Input/Output request is being made, and the requested Input/Output operation.

A request table is built that has as its first entry the extracted userid, as its second entry the extracted subject data record and data field, as its third entry the extracted terminal location address, and, as its fourth entry, the extracted requested Input/Output operation.

The first request table entry for the userid is compared with the first entry of the user security access table and a first security condition "flag" is set to an "allowed" condition if a match is found and failing that, to a "violation" condition.

The fourth request table entry for the requested Input/Output operation is compared with the second entry of the user security access table whenever the first security condition flag is in the "allowed" condition. If no match is found, the first security condition "flag" is set to a "violation" condition.

The second request table entry for the data record or data field entry, the subject of the Input/Output request that was parsed, is compared with the first data security access table entry and a second security condition flag is set to an "allowed" condition if a match is found and, failing that, to a "violation" condition.

The fourth request table entry for the requested Input/Output operation is compared with the second entry of the data security access table whenever the second security condition flag is in the "allowed" condition but if no match is found, the second security condition flag is set to a "violation" condition.

The third request table entry for the terminal location address is compared with the first terminal location security access table entry and a third security condition flag is set to an "allowed" condition if a match is found and to a "violation" condition if otherwise.

The fourth request table entry for the requested Input/Output operation is compared with the second entry of the terminal location security access table whenever the third security condition flag is in the "allowed" condition and the third security condition flag is set to a "violation" condition if no match is found.

The request table entries are then written to a security log database whenever any of the first, second or third security condition flag is in the "violation" condition. The execution of the parsed Input/Output request is cancelled by the host system. However, the Input/Output request is passed on to the host system for processing whenever the first, second and third security condition flags are in the "allowed" condition.

After parsing all the Input/Output requests pending against the databases, control is returned to the host system to continue processing the instruction stream.

The novel features of construction and operation of the invention will be more clearly apparent during the course of the following description, reference being had to the accompanying drawings wherein has been illustrated a preferred form of the device of the invention and wherein like characters of reference designate like parts throughout the drawings.

DESCRIPTION OF THE PREFERRED EMBODIMENTS

Figure 1:
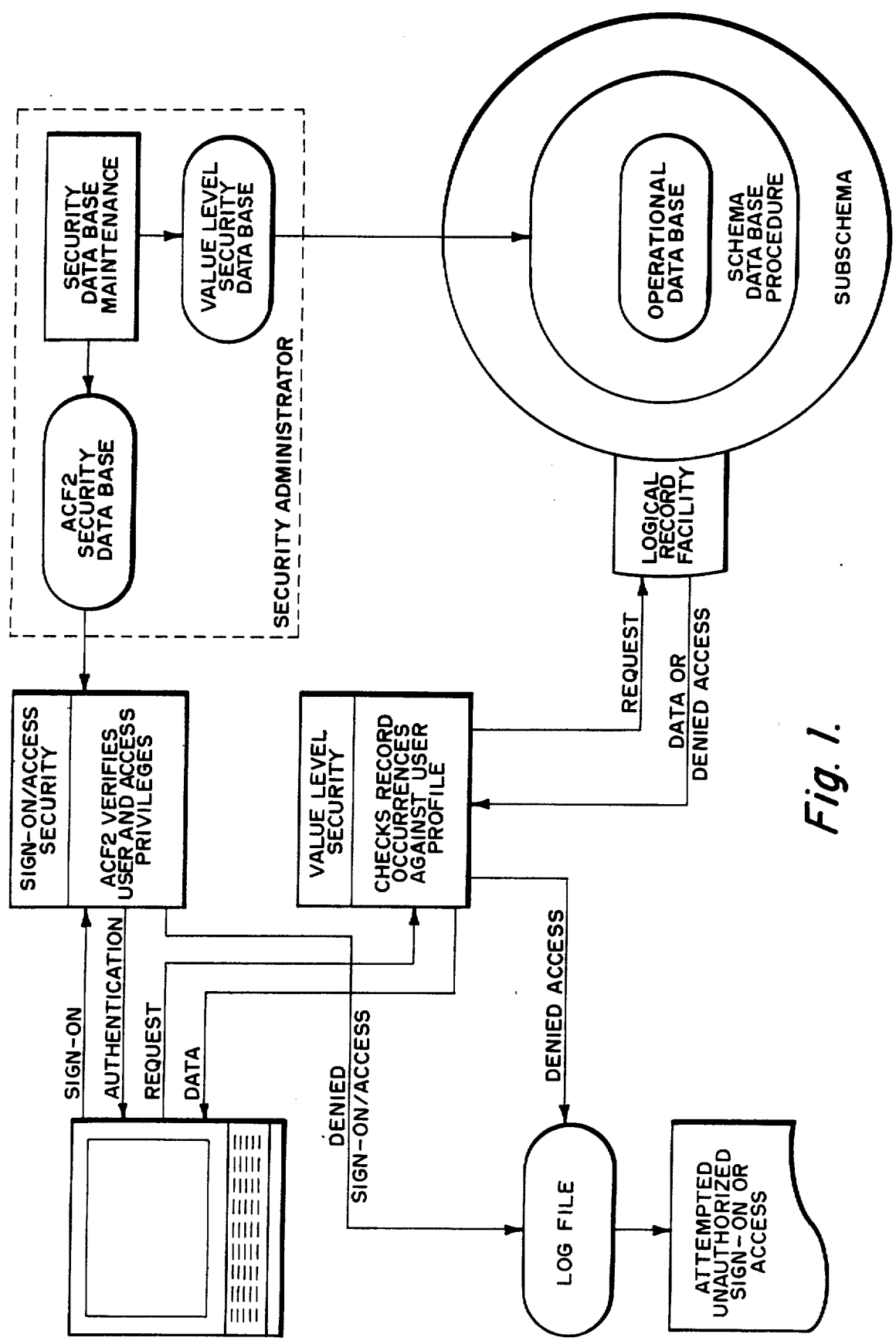
FIG. 1 contains an idealized diagram of the present invention as embodied in a host computer system.
Figure 2:
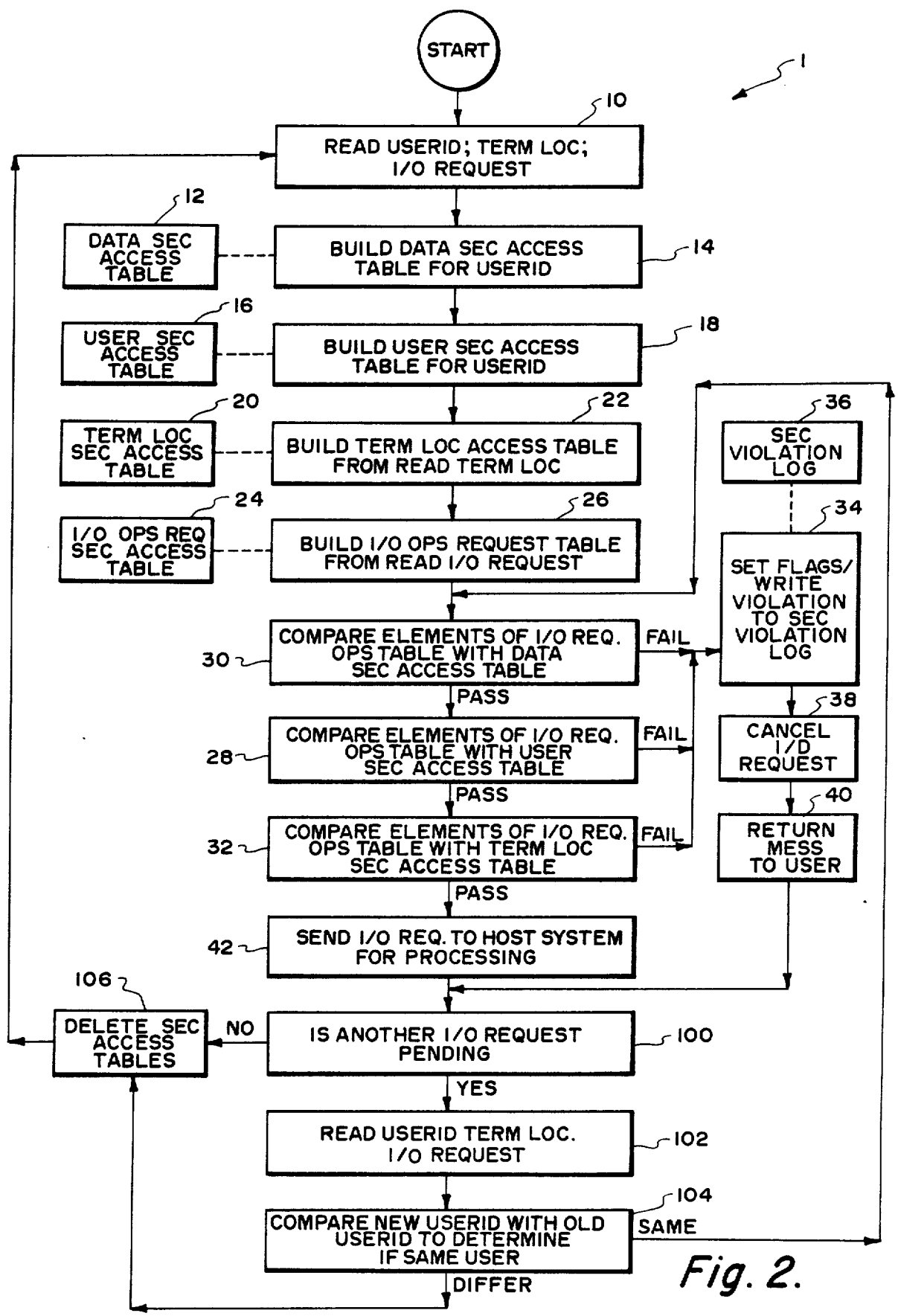
FIG. 2 contains a block diagram flowchart showing the general overall logic flow through a system incorporating the present invention.

A preferred embodiment of the method of the present invention would provide a value based security system that is handles by a single global database procedure.

The method compares information in a user table and a record table against the current record to determine whether access is allowed. In some cases the procedure is capable of immediately determining that an attempted security violation has occurred. In these cases, the procedure returns a code that makes it appear as though the records were not found.

In other cases the application is routed around occurrences in the database that the user is not allowed to access with our permitting any access to these intermediate occurrences or paths.

In either of these two cases, the database procedure never allows access to secure record occurrences unless the user is specifically authorized to access these occurrences.

When an attempted violation has been detected, the procedure cuts an audit trail of attempted security or access violations. The audit trail, for maximum usefulness to security personnel, includes detailed information about the identity of the user and the nature of the attempted access.

The preferred method of the present invention keeps the maintenance of use rules to a minimum by avoiding unnecessary redundancy and duplication using the concept of shared security profiles or access tables.

In general, the invention embodies the belief that a group of system users who have common work-related interest would also have a common "need to know" or access requirements on a particular database. Therefore, the security administrator of a host computer system would be able to define the majority of access privileges by the use of profiles or data access tables, that is a aset of user access rules shared by a group of users. Moreover, the concept was extended to allow an individual user to have multiple profiles within the host system. Demographically, the present invention is based upon the concept that the user community with the host system can be described topographically by defining the set(s) of group(s) to which a user belongs.

In the preferred embodiment of the present invention described below a given user can belong to a number of different profiles or data access tables. The exact number and membership of any one given user can be changed by the security systems programmer at the installation time of the value based security system described below as embodying the present invention.

In addition to user profiles, a given user can have a set of user specific access rules. These user specific rules are preferably very narrow in scope because the vast majority of significant generalizations will be defined witin the profiles. Profile access rules are processed in preference to individual user specific rules. The present invention provides a method that will process all profiles while validating a request, and then if the request is still not satisified it will then process individual user specific access rules if they are present.

Therefore, a preferred embodiment of the method of the present invention is as a value based security system in a computer host system.

Specifically, the method of the present invention would provide a value based security system for interfacing Input/Output requests between at least one system user and a database within the host system. The system user is identified by a unique user identification symbol and is attempting to access the host system from at least one terminal location having a unique terminal address within the host system.

The host system would preferably have at least one global database having data records, including data fields.

In this environment, the invention is preferably embodied in a method for providing occurrence level, value based security protection, that limits to selected users and terminal locations, access to preselected, but variable, Input/Output operations on chosen data records and data fields of the database.

The method preferably comprises a set of procedures operating within the host system archecture, that establish, at system sign on by the user, a data security access table for the system user.

This data security access table has, for each data record and data field selected for security protection, a first entry identifying the data record and data field and, a second entry, associated with the first entry, that defines the Input/Output operations permitted on each data record and data field identified by the first data security access table entry.

Also, at system sign on by the user, a second user security access profile table is established for the subject system user.

This second user security access profile table defines, for each user selected to have authorized access for performing Input/Output operations on the database, a first entry identifying the unique user identification symbol of the selected user, and a second entry associated with the first entry that defines the Input/Output operations permitted on the database by each user identified by the first user security access profile table entry.

A terminal location security access table is further established in the system at this time.

This terminal location security access table has, for each terminal location selected to have access for performing Input/Output operations on the database, a first entry that identifies the terminal location and a second entry associated with the first entry that defines the Input/Output operations permitted on the database for each terminal location identified by the first terminal location security access table entry.

Specifically, the user access profile table and the terminal location security access table are constructed within the host system environment by parsing the system sign-on by the system user and extracting therefrom the unique user identification symbol.

After this, each of the respective tables is built by comparing the extracted unique user identification symbol against a value based security database having, for each unique user identification symbol, a first entry representing the unique user identification symbol and a second entry containing a selected set of access rules associated with the first entry for determining allowable Input/Output operations by the identified system user.

The allowable Input/Output operations associated with the unique user identification symbol detail specific allowed operations upon selected data records and fields of the database and identify selected terminal locations from which each of the Input/Output operations on the database is allowable.

In order to avoid unnecessary Input/Output operations between the present method of the invention and the main operating system of the host system, as well as to make the processing logic simpler in the database procedures, the information contained in the above created tables is created at the user's system logon and retained throughoutthe user's system session until system logoff.

Once these value tables are established in the system, the method of the present invention is ready to parse each Input/Output operation request from the host system to the database.

Using these parsed requests, an Input/Output operations request table is built having as its first entry the unique user identification symbol of the system user making the Input/Output operation request, as its second entry the data record and data field that is the object of the Input/Output operation request being parsed, as its third entry the terminal location address from which the Input/Output operation request is being made, and, as its fourth entry the entered Input/Output operation request being made.

Each of the data entry elements of the Input/Output operation request table are sequentially compared with its corresponding data entry element found in the user security access table, the data security access table, and the terminal location security access table, respectively. A corresponding "flag" is set to an "allowed" or "violation" condition in the event of a "match" or "no match" being found between corresponding data entry elements being respectively compared.

Once the comparison between elements and tables is made, the Input/Output operation request table entries are written to a security violation log database, whenever at least one of the "flags" corresponding to the Input/Output operation request table entries is in a "violation" condition.

The execution of the parsed Input/Output operation request from the host system is also cancelled in this situation.

As an additional measure of security, the preferred embodiment of the method of the present invention does not directly inform the system user that a "violation" has occurred, thereby possibly alerting the individual to the detection of the attempted unauthorized act, but returns instead a message, such as "not found" to the system user.

In this manner, a discrete investigation can be made to determine whether the unauthorized action was made in error, or as part of a calculated act to gain unauthorized access to a protected area.

Nevertheless, the method of the present invention could also include returning to the system user a message that warned of the attempted unauthorized access such as by returning a message that read, "unauthorized access".

With this latter procedure, the system user is immediately informed of the unauthorized activity and, if done in error, could inform the proper authorities.

Likewise, if the unauthorized act was done purposely, the system user would possibly be sufficiently frightened to leave the host system immediately, thus preventing any security breach at the earliest possible time.

The preferred method of the invention being described would also terminate the system user's logon, or access to the host system, after logging the unauthorized activity, with its associated identifying characteristics, after either a single or a pre-set number of unauthorized acts. In this manner, the method of the present invention provides a security system that limits any unauthorized activity by limiting the number of individual attempts made by any one system user during any one logon session.

However, the parsed Input/Output operation request is returned to the host system for processing whenever all of the "flags" corresponding to the Input/Output operation request table entries are in a "allowed" condition.

In this latter case, the system user has been determined by the method of the invention to be a valid user located at a valid terminal that is attempting to execute an authorized activity upon a permitted portion of the database being protected.

Finally, to terminate the system user session within the host system, control is returned to the host system after parsing all Input/Output operation requests received from the host system against the database.

Even after the particular system user has left the host system, the preferred method of the present invention will retain a audit trail history that will permit security personnel to examine, with particularity, each attempted unauthorized system logon and activity that occured within the host system.

In order to accomplish this, the data security access table, the user security access profile table and the terminal location security access table are retained within the host system until the system user terminates the session with the host computer system, that is logs off the system.

The invention described above is, of course, susceptible to many variations, modifications and changes, all of which are within the skill of the art. It should be understood that all such variations, modifications and changes are within the spirit and scope of the invention and of the appended claims. Similarly, it will be understood that it is intended to cover all changes, modifications and variations of the example of the invention herein disclosed for the purpose of illustration which do not constitute departures from the spirit and scope of the invention.

What is claimed is:

1. In a computer host system interfacing Input/Output requests between at least one system user identified by a unique user identification symbol that is accessing the host system from at least one terminal location having a unique terminal address, and the host system having at least one database having data records, including data fields, a method for providing occurrence level, value based security protection, limiting to selected users and terminal locations access to preselected, but variable Input/Output operations on selected data records and data fields of the databases, comprising the steps of:

(a) establishing at said computer host system a data security access table having, for each data record and data field selected for security protection, a first entry identifying the data record and the data field and a second entry representing a data security profile associated therewith, said second entry defining the Input/Output operations permitted on the the data record and data field identified by said associated first entry;

(b) establishing at said computer host system a user security access table having, for each user selected to have Input/Output access to the database, a first entry identifying the user and a second entry representing a user security profile associated therewith, said second entry defining the Input/Output operations permitted on the database by the user identified by said associated first entry;

(c) establishing at said computer host system a terminal location security access table having, for each terminal location selected to have Input/Output operation access to the database, a first entry identifying the terminal location and a second entry representing a terminal location security profile associated therewith, said second entry defining the Input/Output operations permitted on the database from the terminal location identified by said associated first entry;

(d) parsing each Input/Output request from the host system to the database and extracting therefrom: (1) the unique user identification symbol of the system user making the Input/Output request; (2) the data record or data field that is the subject of the Input/Output request; (3) the terminal location address from which the Input/Output request is being made; and, (4) the requested Input/Output operation;

(e) building at said computer host system a request table having as its first entry the extracted unique user identification symbol, as its second entry the extracted subject data record and data field, as its third entry the extracted terminal location address, and as its fourth entry the extracted requested Input/Output operation;

(f) comparing said first request table entry for the unique user identification symbol with the first entry of the user security access table and setting at said computer host system a first security condition "flag" to an "allowed" condition if a match is found and otherwise to a "violation" condition;

(g) comparing said fourth request table entry for the requested Input/Output operation with said second entry of said user security access table whenever said first security condition "flag" is in said "allowed" condition and setting said first security condition "flag" to a "violation" condition if no match is found;

(h) comparing said second request table entry for the data record or data field entry that is the subject of the Input/Output request with the first data security access table entry and setting at said computer host system a second security condition "flag" to an "allowed" condition if a match is found and otherwise to a "violation" condition;

(i) comparing said fourth request table entry for the requested Input/Output operation with said second entry of said data security access table whenever said second security condition "flag" is in said "allowed" condition and setting said second security condition "flag" to a "violation" condition if no match is found;

(j) comparing said third request table entry for the terminal location address with the first terminal location security access table entry and setting at said computer host system a third security condition "flag" to an "allowed" condition if a match is found and to a "violation" condition otherwise;

(k) comparing said fourth request table entry for the requested Input/Output operation with said second entry of said terminal location security access table whenever said third security condition "flag" is in said "allowed" condition and setting said third security condition "flag" to a "violation" condition if no match is found;

(l) writing at said computer host system said request table entries to a security log database whenever said first, second or third security condition "flag" is in said "violation" condition and cancelling the execution of the parsed Input/Output request by the host system;

(m) returning the Input/Output request to the host system for processing whenever said first, second and third security condition "flag" is not in said "violation" condition.

2. In a computer host system interfacing Input/Output requests between at least one system user identified by a unique user identification symbol that is accessing the host system from at least one terminal location having a unique terminal address, the host system further having at least one database having data records, including data fields, a method for providing occurrence level, value based security protection, limiting to selected users and terminal locations, access to preselected, but variable Input/Output operations on selected data records and data fields of the databases, the method comprising the steps of:

(a) establishing at said computer host system at system sign on by the system user, a data security access table for the system user having, for each data record and data field selected for security protection, a first entry identifying the data record and data field and a second entry associated with said first entry, defining the Input/Output operations permitted on the data record and data field identified by said associated first entry;

(b) establishing at said computer host system at system sign on by the system user, a user security access profile table for the system user having, for each user selected to have authorized access for performing Input/Output operations on the database, a first entry identifying the unique user identification symbol of the selected user, and a second entry representing a user security profile associated with said first user security access profile table entry, said second entry defining the Input/Output operations permitted on the database by the user identified by said associated first entry;

(c) establishing at said computer host system a terminal location security access table having, for each terminal location selected to have access for performing Input/Output operations on the database, a first entry identifying the terminal location and a second entry representing a terminal location security profile associated with said first terminal location security access table entry, said second entry defining the Input/Output operations permitted on the database for the terminal location identified by said associated first entry;

(d) parsing each Input/Output operation request from the host system to the database and building at said computer host system an Input/Output operations request table having as its first entry the unique user identification symbol of the system user making the Input/Output operation request, as its second entry the data record and data field that is the object of the Input/Output operation request being parsed, as its third entry the terminal location address from which the Input/Output operation request is being made, and, as its fourth entry the entered Input/Output operation request being made;

(e) comparing sequentially each of said data entry elements of said Input/Output operation request table with its said corresponding data entry element of said user security access table, said data security access table, and said terminal location security access table, respectively, for setting at said computer host system a corresponding "flag" to an "allowed" or "violation" condition in the event of a match or no match being found between corresponding data entry elements being compared respectively;

(f) writing at said computer host system said Input/Output operation request table entries to a security violation log database whenever at least one of said "flags" corresponding to said Input/Output operation request table entries is in said "violation" condition and cancelling the execution of the parsed Input/Output operation request from the host system; and, (g) returning the parsed Input/Output operation request to the host system for processing whenever all of said "flags" corresponding to said Input/Output operation request table entries are in said "allowed" condition.

3. A method as in claim 2 further including the step of retaining said data security access table, said user security access profile table and said terminal location security access table until the system user logs off the host computer system.

4. A method as in claim 3 wherein said step of establishing said data security access table, said user access profile table an said terminal location security access table, each includes the steps of:

(i) parsing the system sign on by the system user and extracting therefrom the unique user identification symbol;

(ii) building each of said respective tables by comparing said extracted unique user identification symbol against a value based security database having for each unique user identification symbol a first entry representing the unique user identification symbol and a second entry containing a selected set of access rules associated with said first entry for determining allowable Input/Output operations by the system user associated with the unique user identification symbol on selected data records and fields of the database and identifying selected terminal locations from which each of said Input/Output operations on the database is allowable.

5. A method as in claim 2 wherein step f includes the step of returning a "not found" message to the system user.

6. A method as in claim 2 wherein step f includes the step of returning a "security access violation" message to the system user.

* * * * *